UNITED STATES PATENT OFFICE.

RUDOLF HAUGWITZ, OF FRIEDRICHSHAGEN, NEAR BERLIN, GERMANY, ASSIGNOR TO ACTIEN GESELLSCHAFT FÜR ANILIN FABRIKATION, OF BERLIN, GERMANY.

TRISAZO DYES.

1,209,154.  Specification of Letters Patent.  Patented Dec. 19, 1916.

No Drawing.  Application filed July 24, 1916. Serial No. 111,048.

*To all whom it may concern:*

Be it known that I, RUDOLF HAUGWITZ, a citizen of the Empire of Germany, residing at Friedrichshagen, near Berlin, Germany, (my post-office address being Seestrasse 97, Friedrichshagen, near Berlin, Germany,) have invented certain new and useful Improvements in Trisazo Dyes, of which the following is a specification.

My present invention relates to new trisazo dyes of the general constitution:

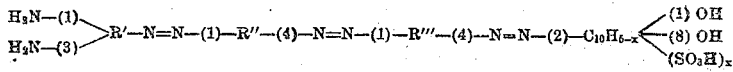

R', R" and R'" being radicals of the benzene series.

These dyes in the shape of their pulverized dry sodium salts are blackish powders, soluble in water with a violet color, in concentrated sulfuric acid with a blue color. The aqueous solution by addition of an alkali becomes bluer, by acidifying the dyes settle out as reddish precipitates. By strong reducing agents the dyes are destroyed. From the aqueous solutions cotton is dyed violet tints turning to black after a treatment with 4-nitrodiazobenzene. The dyeings thus obtained have a good fastness to light and can be discharged to a clean white.

A process for making the new dyes consists in combining a 4.4'-diaminoazo-compound after diazotation with one molecular proportion of a 1.8-dioxynaphthalene sulfonic acid and one molecular proportion of a meta-diamin of the benzene series. This process may be modified for instance in that manner that a 4'-nitro- or 4'-acidylamino-1-diazoazo-compound is coupled with a 1.8-dioxynaphthalene sulfonic acid, whereupon the nitro- or the acidylamino-group respectively is converted into the amino-group which then is diazotized and combined with a meta-diamin.

In order to illustrate in what manner the manufacture of my new dyes may be executed, without limiting the invention, the following example is given, the parts being by weight:

The diaminoazo-dye prepared in known manner by coupling the diazo-compound of 13.8 parts of 4-nitranilin with 13.7 parts of 3-amino-4-methoxy-1-methylbenzene and reducing the nitro-group is diazotized by means of 130 parts of hydrochloric acid of 12° Bé. and 13.8 parts of sodium nitrite. By combining with 36.4 parts of the sodium salt of 1.8-dioxynaphthalene-3.6-disulfonic acid upon the addition of 50 parts of sodium acetate the intermediate product is formed which is mixed with a solution of 12 parts of 1.3-phenylenediamin. The dye is worked as usual. Its constitution is expressed probably by the formula:

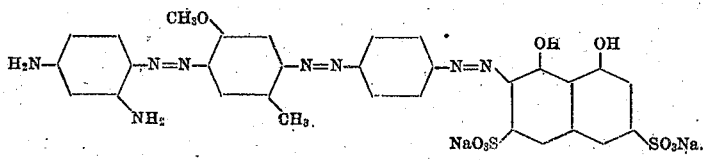

A similar dye is obtained when 1.8-dioxynaphthalene-3.6-disulfonic acid is replaced for instance by 1.8-dioxynaphthalene-4-sulfonic acid.

Having now described my invention what I claim is,—

1. The new trisazo-dyes of the general constitution:

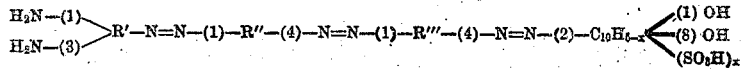

where R', R" and R'" mean radicals of the benzene series, being in the shape of their pulverized dry sodium salts blackish powders, soluble in water with a violet color, in concentrated sulfuric acid with a blue color; the aqueous solutions by addition of an alkali becoming bluer, by acidifying the dyes settling out as reddish precipitates; being destroyed by strong reducing agents; dyeing cotton from aqueous solutions violet tints which turn to black after a treatment with 4-nitrodiazobenzene.

2. The new trisazo-dye which derives from 1.4-phenylenediamin-azo-3-amino-4-methoxy-1-methylbenzene, 1.8-dioxynaphthalene-3.6-disulfonic acid and 1.3-phenylenediamin and probably corresponds to the formula:

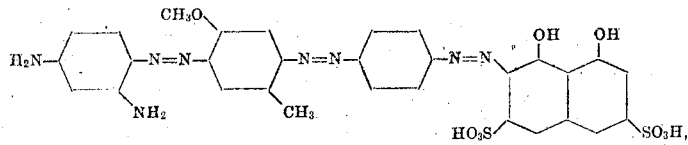

being in the shape of its pulverized dry sodium salt a blackish powder soluble in water with a violet color, in concentrated sulfuric acid with a blue color; the aqueous solution by addition of an alkali becoming bluer, by acidifying the dye settling out as a reddish precipitate; being destroyed by strong reducing agents; dyeing cotton violet tints, which turn to black after a treatment with 4-nitrodiazobenzene.

In testimony whereof I affix my signature in presence of two witnesses.

RUDOLF HAUGWITZ.

Witnesses:
HENRY HASPER,
ALLEN F. JENNINGS.